US005572033A

United States Patent [19]

Grant

[11] Patent Number: 5,572,033

[45] Date of Patent: Nov. 5, 1996

[54] WIDE-ANGLE INFRA-RED DETECTION APPARATUS

[75] Inventor: John T. Grant, Reepham, England

[73] Assignee: Security Enclosures Limited, United Kingdom

[21] Appl. No.: 379,329

[22] Filed: Jan. 26, 1995

[30] Foreign Application Priority Data

Jan. 27, 1994 [GB] United Kingdom .................. 9401548

[51] Int. Cl.[6] ............................................ G01J 5/08

[52] U.S. Cl. .................... 250/353; 250/349; 250/DIG. 1

[58] Field of Search ............................. 250/DIG. 1, 353, 250/342, 349

[56] References Cited

U.S. PATENT DOCUMENTS

| | | | |
|---|---|---|---|
| 3,958,118 | 5/1976 | Schwarz | 250/221 |
| 4,704,533 | 11/1987 | Rose et al. | 250/DIG. 1 |
| 4,752,769 | 6/1988 | Knaup et al. | 250/342 |
| 4,841,284 | 6/1989 | Biersforff | 250/342 |
| 5,101,194 | 3/1992 | Sheffer | 250/DIG. 1 |
| 5,107,120 | 4/1992 | Tom | 250/DIG. 1 |
| 5,134,292 | 7/1992 | Segawa et al. | 250/342 |
| 5,227,632 | 7/1993 | Armstrong et al. | 250/349 |
| 5,446,285 | 8/1995 | Choi | 250/338.3 |

FOREIGN PATENT DOCUMENTS

| | | | |
|---|---|---|---|
| 5244086 | 1/1985 | Australia . | |
| 0148593 | 7/1984 | European Pat. Off. . | |
| 0219954A1 | 9/1986 | European Pat. Off. . | |
| 0537024A1 | 10/1992 | European Pat. Off. | 250/DIG. 1 |
| 3812969A1 | 11/1989 | Germany . | |
| 88392 | 4/1989 | Japan | 250/DIG. 1 |
| 596619 | 3/1978 | Switzerland . | |
| 2012045 | 12/1978 | United Kingdom . | |
| 1561407 | 2/1980 | United Kingdom . | |
| 2141228 | 6/1984 | United Kingdom . | |
| 2186972 | 11/1986 | United Kingdom . | |

*Primary Examiner*—Carolyn E. Fields
*Attorney, Agent, or Firm*—Baker & Botts L.L.P.

[57] ABSTRACT

A passive infra-red detection apparatus is described, which comprises an infrared sensor array (16) mounted in a housing (10), and a focusing reflector system (20, 22) and focusing refractor (14) which focus infra-red radiation from different distance ranges onto the sensor array (16). The sensor array (16) comprises at least three sensing elements or groups of elements (16A, 16B, 16C) spaced apart transversely with respect to the lens axis of the focusing refractor (14). Thus in combination with a multiple reflector (20, 22) having at least three reflector surfaces and/or a multiple focusing refractor (14), the sensor array receives several different views spaced apart transversely thereby providing a wider viewing angle than the prior art construction. Thus, the present detector is more suited to use with a closed-circuit television (CCTV) surveillance system.

18 Claims, 7 Drawing Sheets

WIDE-ANGLE INFRA-RED DETECTION APPARATUS

This invention relates to infra-red detection apparatus having an infra-red pyroelectric sensor and long pass filter combined with a focusing mirror, plane mirror and Fresnel lens array.

Such apparatus is disclosed in our European Patent Publication No. 0537024A. The combination of the lens array and mirrors produces discrete spaced-apart fields of view which in a typical embodiment provide a 'curtain of coverage' in a vertical plane. Detection apparatus using this arrangement is suitable for use along the perimeter boundary of a secure area and to provide an alarm signal whenever the fields of view are traversed by an intruder. The alarm signal may be used to activate an alarm system, CCTV surveillance system, security lighting or other response system.

Field experience indicates that when the apparatus is located with CCTV cameras and used as a motion sensor to activate video recording equipment or other warning systems, it can have certain shortcomings. Firstly, the area covered by the known apparatus extends typically 100 metres with a radial spread of some 3 degrees, whereas the area covered by a typical CCTV camera lens is invariably wider, typically 20 degrees. Thus, when co-located with a CCTV camera, the existing apparatus does not provide motion sensing over the whole area covered by the camera lens. Secondly, when used in rural outdoor locations, alarm activation may be caused by warm-blooded animals such as rabbits, dogs and foxes moving into the fields of view where they impinge the ground. Whilst these activations may have little consequence when used with a CCTV system, they can cause an undesirably high false-alarm rate when the apparatus is combined with intruder alarm systems and CCTV cameras are not installed.

It is an object of the invention to provide improved infra-red apparatus.

According to this invention, infra-red detection apparatus comprises an infra-red sensor array mounted in a housing, a focusing reflector system constructed and arranged in the housing to focus infra-red radiation received from a first range of distances onto the array, and a focusing refractor constructed and arranged in the housing to focus infra-red radiation from a second range of distances onto the array, the second distance range encompassing distances shorter than the first distance range, wherein the sensor array comprises at least three sensing element or groups of sensing elements, which elements or groups are spaced apart transversely with respect to a lens axis of the focusing refractor, and wherein the focusing reflector system includes a multiple reflector having at least three reflector surfaces each oriented to direct incoming radiation to a different transverse position on the sensor array.

In a preferred embodiment of the invention the housing has a front window forming at least part of a front wall of the housing and the reflector system comprises a first mirror mounted within the housing in a rearward position with respect to the window and directed generally towards the window, and a second mirror above or below the window and the first mirror and directed generally towards the first mirror, the sensor array being respectively below or above the window and the first mirror, whereby infra-red radiation entering the housing through the window is reflected by the first mirror onto the second mirror where it is then reflected onto the sensor array. The multiple reflector may be a single multi-faceted mirror having three or more facets angled with respect to each other or it may be a group of mirrors angled with respect to each other. In the case of the focusing reflector system comprising a first, plane reflector and a second, concave reflector, it is preferably the plane reflector which is multi-faceted or consists of differently angled plane mirrors, but it is possible for the concave reflector to have a plurality of concave facets or sections each having a focusing axis angled with respect to the axes of the other facets or sections. As a result it is possible to produce a well-defined image from infra-red radiation emitted by a body at a range in excess of 25 metres, and preferably in excess of 50 metres over an area radially spaced 10°, preferably 15°, either side of a centre axis.

The sensor array of the preferred embodiment has a number of sensors which corresponds to the number of reflector surfaces of the multiple reflector, and each sensor has two sensing elements arranged side-by-side in the transverse direction, i.e. along the line of sensing elements running transversely to the refractor lens axis referred to above. The orientation of the reflector surfaces is such that the combination of the focusing reflector and the sensor array has a plurality of pairs of fields of view radiating from the front window of the housing, the number of pairs being equal to the multiple of the number of sensors and the number of reflector surfaces of the multiple reflector. Preferably, the arrangement of the reflector surfaces and the sensors is such that the individual fields of view or pairs of fields of view are in groups such that the complete viewed sector covered by the arrangement is divided into a plurality of consecutive smaller sectors each corresponding to a respective one of the groups, with the number of groups corresponding to the number of reflector surfaces. Within each group there is a number of individual fields of view or pairs of fields of view corresponding to the number of sensors receiving radiation from the respective reflector surface.

Whether each group contains individual fields of view or pairs of fields of view depends on whether the sensors each contain one or a pair of sensing elements. It will be appreciated that if each of the sensors contains more than two sensing elements, each group will be made up of sub-groups of three or more fields of view.

A similar arrangement of fields of view at closer ranges may be provided by arranging for the focusing refractor to have a plurality of lenses with differently oriented lens axes, each lens accounting for a number of pairs of fields of view corresponding to a number of dual-element sensors. The lenses are preferably Fresnel lenses formed in the same piece of infra-red-transparent material as a plain window portion for the passage of radiation received by the reflector system.

To reduce false alarms due to the number of fields of view, the sensors are connected to an electronic signal processing arrangement preferably mounted inside the housing and constructed so that an alarm condition is signalled only when at least two sensor output signals occur at different respective sensor outputs within a predetermined time interval. The output signals may be changes in voltage level of one or more sensing elements of a sensor, or changes in the difference between the output voltage levels of two sensing elements of the sensor. Thus, an intruder moving across different fields of view will cause successive output signals in different sensors, giving rise to an alarm condition, whereas occasional, spasmodic movements due to small animals, for example, are more likely to produce output signals in only one sensor within the predetermined time interval. The interval is typically 10 seconds, but may be in the range of 3 seconds to 30 seconds.

In this way it is possible to provide coverage to match the coverage of typical CCTV lenses while substantially reducing the false alarm rate from animals which would normally result when a multiple fields of view system is used in an outdoor environment.

It has been stated above that the focusing reflector system receives radiation from a first range of distances while the focusing refractor receives radiation from a second range of distances, the second range encompassing distances which are shorter than the first range. Advantageously, the focusing refractor can be made up of lenses which produce fields of view spaced not only angularly over the viewed sector, but also spaced in a vertical plane so as to define different ranges corresponding to different declinations with respect to the horizontal. Additional, shorter, ranges may be produced by including a further reflector in the housing which is located so as to receive radiation via the lenses from a steeper angle of declination for reflection onto the sensors. This reflector may be a mirror having a reflecting surface which is curved so as to increase the aspect ratio of the fields of view provided by this reflector in comparison with the aspect ratio of the other fields of view. In other words the image of a radiating object incident on the sensor array is reduced in height in comparison with its width. This may be achieved by arranging for the reflecting surface to be concave and to have its smallest radius of curvature about a horizontal axis running transversely to the lens axis or axes. In particular, the reflecting surface may be part-cylindrical about such a horizontal axis. The overall field of view of the preferred apparatus is in the region of 30 degrees (15 degrees either side of the central axis), extending to a maximum distance of 50 to 80 metres when the apparatus is located at about 2.3 metres above the ground, the double fields of view due to the reflector system being arranged to decline and impinge on the surface at typically 70 metres range. Consequently, an intruder crossing the area of coverage would normally be detected after travelling 5 metres or less.

The energy collected from an intruder within a field of view of a given solid angle remains substantially constant with increasing range providing he fully fills the field of view. Although the energy decreases with the square of the distance, the area of the target covered by the field of view increases with the square of the distance to compensate. Thus the signal obtained when an intruder crosses into a field of view remains substantially constant at increasing distance until he no longer fully fills the field of view, whereupon the signal diminishes with the square of the distance. It follows that it is preferable to use relatively long focal length systems for long range imaging. In the preferred embodiment of the invention fields of view beneath the main, long range rank, i.e. additional to those provided by the reflector system, are arranged to decline at greater angles in order to detect intruders moving closer to the detector and beneath the level of the main fields of view. In practice it is desirable to arrange that the lower ranking fields of view have focusing systems, i.e. the Fresnel lenses referred to above, with focal lengths shorter than the main fields of view. This is beneficial for two reasons: Firstly, a shorter focal length allows the use of smaller apertures (lenses) for the same or similar number. Secondly, the area covered where the wider angle field of view impinges on the ground is larger than would be the case with a long focal length system, therefore small animals are less likely to fill the field of view fully.

In the preferred embodiment the main rank of nine double fields of view is supplemented by four additional ranks each angled downwardly to a different extent with the steepest rank declining some 30 degrees from the horizontal. These fields of view are produced by a system having a focal length of around half that of the reflector system producing the main rank. In an ideal system each downward rank would have a focal length to suit the coverage required such that the steepest ranks (closest to the detector) might have a focal length some 10 percent of the main rank, but for practical reasons of manufacturing simplicity the present apparatus uses two focal lengths, typically about 100 mm for the main ranks (the reflector system) and 50 mm for the lower ranks (the focusing refractor), i.e. the focal length of one is about one half of the focal length of the other. To increase further the area of ground covered by the steepest two ranks, the preferred apparatus uses a secondary cylindrically curved reflector, as mentioned above, which modifies the aspect ratio of the fields of view to have height to width ratios of typically 4:1 compared to the 2:1 ratio of the other ranks. Thus the area of the ground covered by these steeper fields of view is elongated thereby reducing the chance of animals filling the field of view but ensuring that a normally vertical intruder still fully fills it. The reflector is curved in one plane only to cause this vertical elongation of the fields of view.

The preferred apparatus also has the following features. It has passive infra-red sensor means, a focusing reflector constructed and arranged to focus infra-red radiation received by the apparatus from a first distance range on the sensor means, and focusing refractors constructed and arranged to focus infra-red radiation received by the apparatus from a second distance range on the sensor means, the second distance ranges being shorter than the first distance range. The focusing refractors are an array of Fresnel lenses formed in a sheet of polyethylene material, the array of lenses causing radiation received from an object within the second distance ranges to converge on the sensor means, which are positioned at or near the focal plane of the array of lenses. The sensor means and the reflector are contained within a housing one wall of which is formed as a window facing the scene to be surveyed. Advantageously, the window is a polyethylene film, part of which, preferably a lower pan, is formed as an array of Fresnel lenses, and another part of which is parallel-sided so as to pass infra-red radiation largely without refraction.

The focusing reflector may be a concave mirror arranged to receive radiation through the plane portion of the window from objects in the first distance range to cause such radiation to converge on the sensor means. A second, plane reflector is used as an intermediate reflector in the optical path between the window and the above-mentioned focusing refractor. For instance, if the sensors are located in a lower part of the housing at or near the effective focal plane of the Fresnel lenses, the concave reflector is best positioned in the top part of housing with its reflective surface facing downwards and away from the window, and the second reflector is best mounted generally at the same level as the plain, parallel-sided part of the window rearwardly with respect to the concave reflector oriented so that radiation from a distant object is reflected upwardly to the concave reflector which then reflects the radiation downwardly to converge on the sensor means. The sensor means are located at or near the focal plane of the concave reflector, i.e. at or near the intersection of the focal planes of the concave reflector and the Fresnel lenses. It will also be appreciated that a similarly compact arrangement may be achieved with the sensor means in an upper part of the housing and with the concave reflector in a lower part.

In practice, when the apparatus is mounted some distance above the ground, for example at a height of two metres or greater, the positioning of the sensor means and the optical components described above determines the effective ranges within which radiation sources may be detected according to the inclination of the paths of the incoming radiation with respect of the horizontal. Thus, radiation emanating from a body less than 25 metres from the apparatus will be incident upon the window at a greater angle with respect to the horizontal than radiation emanating from a body at, for example, 50 metres. Accordingly, the positioning of the concave and plane reflectors with respect to the sensor means and the parallel-sided part of the window is arranged such that radiation from objects at a distance of 50 metres or greater is directed onto the sensor means, while the position of the sensor means with respect to the lower part of the window, containing the Fresnel lenses is such that the sensor means receive radiation only from objects at a distance of 25 metres or less. The apparatus includes a second reflector in the region between the Fresnel lens or lenses and the sensor means and alongside the radiation path therebetween in order to reflect radiation instant upon the Fresnel lens at a steeper angle of inclination (i.e. emanating from objects much nearer than 25 metres) onto the sensor means. When the sensor means are located in a lower part of the housing, it is advantageous that this second plane mirror has a downwardly facing surface and is positioned generally above the path of radiation travelling directly between the Fresnel lens and the sensor means so that the reflector can act as a shield protecting the sensor means from direct sunlight.

The invention will now be described by way of example with reference to the drawings in which.

Figure 1:
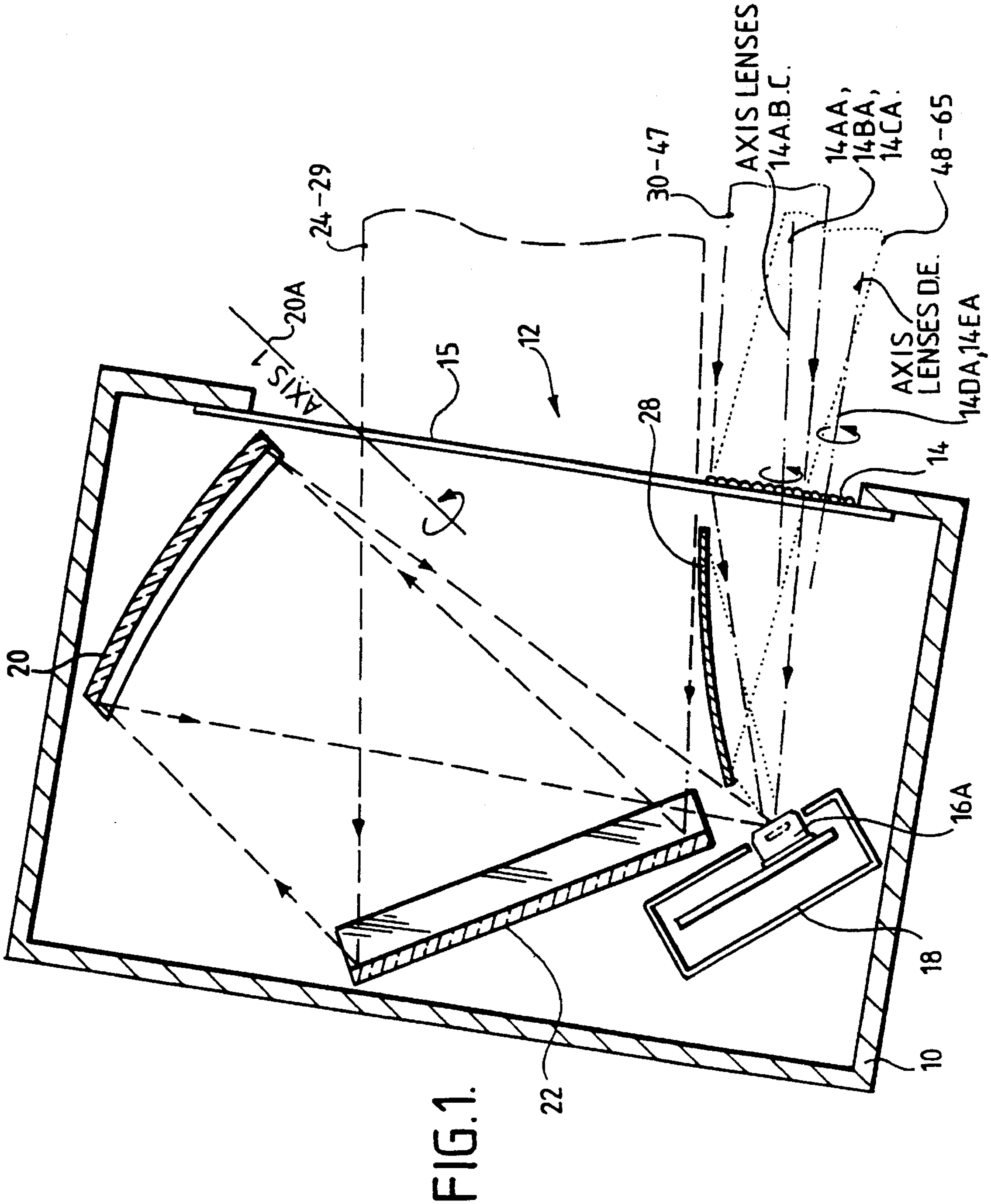
FIG. 1 is a sectional side view of apparatus in accordance with the invention.

Referring to FIG. 1, infra-red detection apparatus in accordance with the invention has an outer housing 10 with a front aperture covered by a polyethylene film window 12 which is sufficiently thin to pass infra-red radiation having a wavelength typically in the region of 7 to 11 microns without significant absorption. As will be seen from both FIGS. 1 and 2, the window 12 has a lower pan which is ribbed on one surface to form an array 14 of Fresnel lenses 14A to 14E having lens axes 14AA, 14BA, 14CA, 14DA and 14EA. The remainder of the window, i.e. the upper part 15, is generally parallel-sided and is smooth on both sides so as to pass radiation substantially without refraction. The housing, together with its window provides environmental protection and electrical screening. It will also be noted that the housing 10 is taller than it is deep.

Situated inside the lower part of the housing 10 are pyro-electric sensors 16A, 16B and 16C each containing one or more heat sensing elements and mounted adjacent each other in a horizontal line parallel to the window 12 in a metallic casing 18 which also contains electronic circuitry (not shown) for individually amplifying and filtering electrical signals produced by the sensors, as well as for generating an alarm signal or other response. The sensors 16A to 16C include integral long-pass optical filters allowing transmission of long infra-red wavelength radiation (i.e. longer than, for example, 7 microns), and are directed both towards the Fresnel lenses 14A to 14E and towards the upper pan of the housing 10 so as to be sensitive to radiation incident directly from the window 12 and from the upper pan of the housing. In order that radiation emanating from objects 25 metres or less from the apparatus is incident upon the sensors 16A to 16C, the latter are positioned at least approximately in the focal plane of the Fresnel lenses 14A to 14E at a level corresponding to the position of the image produced by a radiating object at the expected declination with respect to the window 12 for an object within that distance range, taking into account the intended mounting orientation of the housing 10 with respect to the horizontal and its height above ground. Fresnel lenses 14A to 14E are, of course, positive, converging lenses formed on the inner or outer surface of the window 12.

Each sensor 16 preferably has two heat sensitive elements typically 1 mm wide by 2 mm high spaced apart by 1 mm. Thus, when located on the focal plane of a collecting lens or mirror it will produce a field of view with a similar width-to-height ratio and a divergence dependent upon focal length. Typically, a focal length of 50 mm results in a field of view approximately 300 mm at 15 metres distance. The sensitivity of the sensor is such that an aperture of not less than f3 is preferred for reliable detection of an intruder at 15 to 20 metres with a focal length of 50 mm. It will, therefore, be appreciated that, in order to detect an intruder reliably at, say, 60 metres range, the optical system requires a focal length of at least 100 mm and an aperture preferably greater than f2. If a lens were to be used, its diameter would be in the region of 50 mm. Such performance cannot be achieved reliably by means of a Fresnel lens made of an inexpensive infra-red transparent material such as polyethylene. A polyethylene lens suitable for passing the longer infra-red wavelengths without significant absorption must be comparatively thin, and since the material is soft and flexible, a lens formed from it displays a considerable lack of flatness resulting in optical aberration and a poorly defined field of view. For this reason, the present apparatus combines a Fresnel lens short range optical system with a mirror-based long range optical system, both using the sensors 16A to 16C. As shown in FIG. 1 a concave mirror 20 (preferably having a parabolic or other conic section) is located oppositely with respect to sensors 16A to 16C in the housing 10, here in the upper part of the housing 10 with its reflecting concave surface facing downwardly and to the rear at a level corresponding to or slightly above the upper edge of the window 12. The upper part 15 of the window 12, above the Fresnel lenses 14A to 14E is parallel-sided for passing infra-red radiation substantially without refraction. A second, multi-faceted mirror 22, having three plane surfaces, is located to the rear of the housing 10 opposite the plane portion 15 of the window 12 with its reflecting surfaces directed forwardly and upwardly so as to direct incoming radiation emanating from objects at a distance of 25 metres or greater upwardly towards the focusing mirror 20. The focusing mirror 20 then focuses such radiation on the sensors 16A to 16C which are located in a horizontal line along the focal plane. The precise positioning of the mirrors 20, 22 with respect to each other and with respect to the sensor 16 is such that radiation entering the window 12 at the angle of declination corresponding to a radiation source at a distance of 25 metres to, say, 60 metres is focused on the sensors 16A to 16C. It will be noted that the multi-faceted plane mirror 22 is positioned so as not to obstruct radiation reflected from the focusing mirror 20 onto sensors 16A to 16C, i.e. it is generally further from the window 12 than the sensors 16A to 16C. The optical axis of the focusing mirror 20 is inclined some 45° with respect to the horizontal, although other angles may be used. The multi-faceted plane mirror 22 is positioned to direct radiation entering the window 12 at an inclination of some 2° upwardly at a new inclination of some 45°. Thus, the housing 10 can be relatively small in depth and the window can be relatively close to the mounting surface. The focal length of the focusing mirror 20 is approximately 100 mm, the focal point being on an offset axis 20A of the mirror located some 10 mm below the front edge of the mirror and parallel to the field of view of the sensors 16A to 16C. The heat sensitive elements of each sensor 16A, 16B, 16C are located horizontally on either side of the respective sensor centre axis. The middle sensor 16B lies on the axis 20A at the focal point. As a result two long range fields of view are provided having a cross-sectional ratio of 2:1 with a divergence in the ratio 100:1 horizontally and 50:1 vertically, as shown by the reference numerals 24A, 24B, 24C and 25A, 25B, 25C in FIGS. 5 and 6. Further similar fields are also produced by the other two sensors 16A, 16C located on a horizontal plane either side of sensor 16B as shown by the reference numerals 26A to 26C, 27A to 27C, 31A to 31C and 29A to 29C.

When an intruder crosses the fields of view 24 to 27, 29, 31, infra-red energy due to body heat enters window 12, and is reflected by one of the plane mirror surfaces 22 onto focusing mirror 20 which then focuses the energy firstly onto one and then secondly on to the other of the heat-sensing elements of one of the sensors 16A to 16C. The connection of the heat-sensing elements is such that one element produces a positive-going electrical signal whilst the other element produces a negative-going signal so that changes in ambient background temperatures produce opposing signals which cancel out, whereas an intruder crossing first one, and then the other field of view will produce a signal of one polarity followed by a signal of the other polarity.

Figure 7:
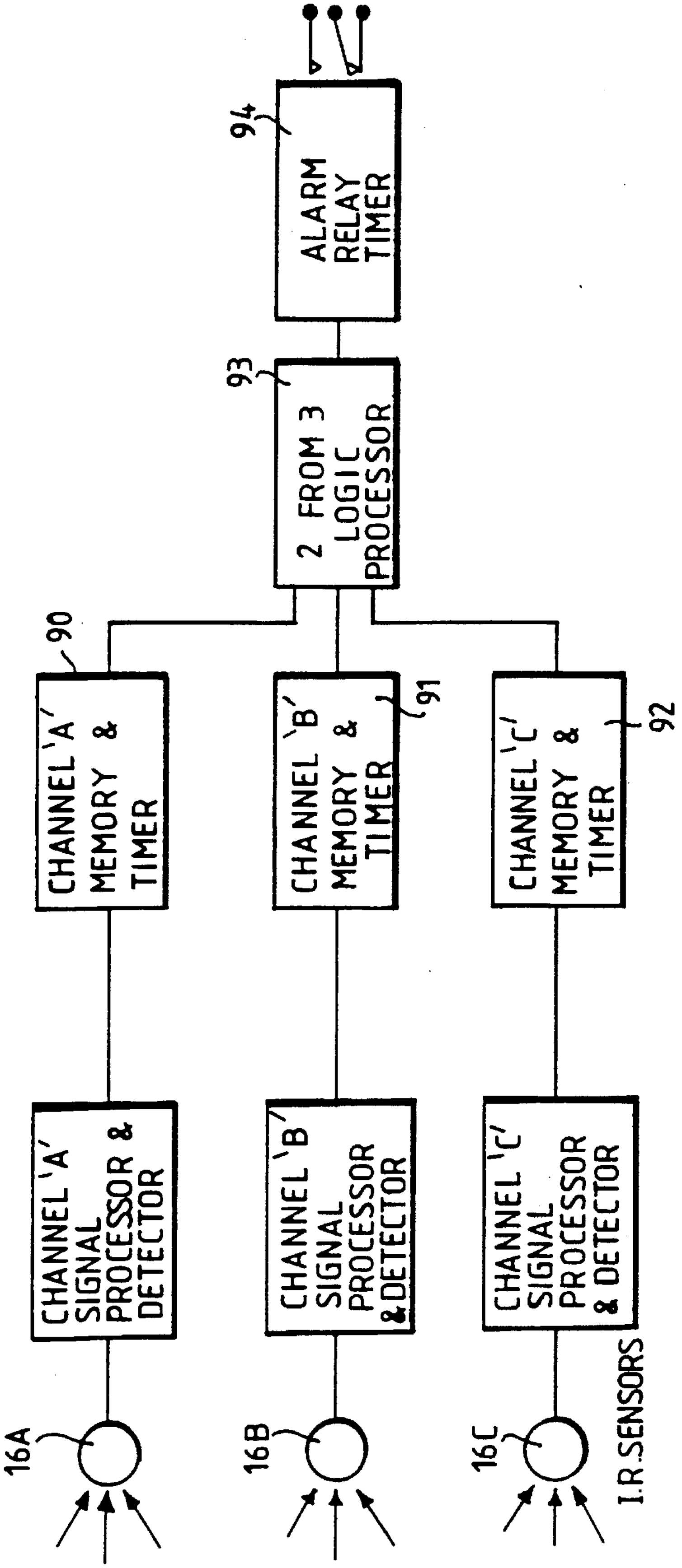
FIG. 7 is a block diagram of an electronic signal processing arrangement.

Referring to FIG. 7, the electronic circuitry coupled to the sensors 16A to 16C is arranged to detect such signal sequences in order to generate a movement detection signal which may be stored in electronic memory means 90, 91, 92 and further processed by a logic processor 93. Providing two or more memories contain a signal, then the logic processor 93 will activate an alarm relay timer 94.

The electronic signal processing arrangement is designed on the basis that while very large animals may be detected, their numbers are far fewer than smaller animals such as rabbits which have been shown from practical experience to be a significant cause of false alarms. Observation shows that rabbits do not generally move at a linear speed but tend to move intermittently, spending much time in one location before moving and stopping at another to eat. Intruders on the other hand, tend to move steadily across successive fields of view.

Motion signals from adjacent fields of view are allocated to separate processing channels so that signal storage and logic processing may be used to reduce significantly false alarms from small animal movements. The nine main fields of view are arranged as three groups of three (left-centre-fight repeated three times) to provide separate signal sources for electronic processing by three separate processors. Signals meeting specific requirements of amplitude, frequency and duration may be stored in an electronic memory for a preset time but not used to signal an alarm. An electronic logic circuit monitors the contents of the three stores and will only signal an alarm condition if any two of three stores contain an intrusion signal. A movement generated signal will only be held in a memory for a predetermined time interval, typically 10–15 seconds, so that, for instance, a rabbit moving into a field of view may be detected and cause a signal to be stored but is unlikely to move into an adjacent field of view within the time interval, whereas an intruder is most likely to move across more than two fields of view within the allotted time. The number of channels used, the logic conditions and time periods may be varied to suit individual site and security. requirements.

Figure 3:
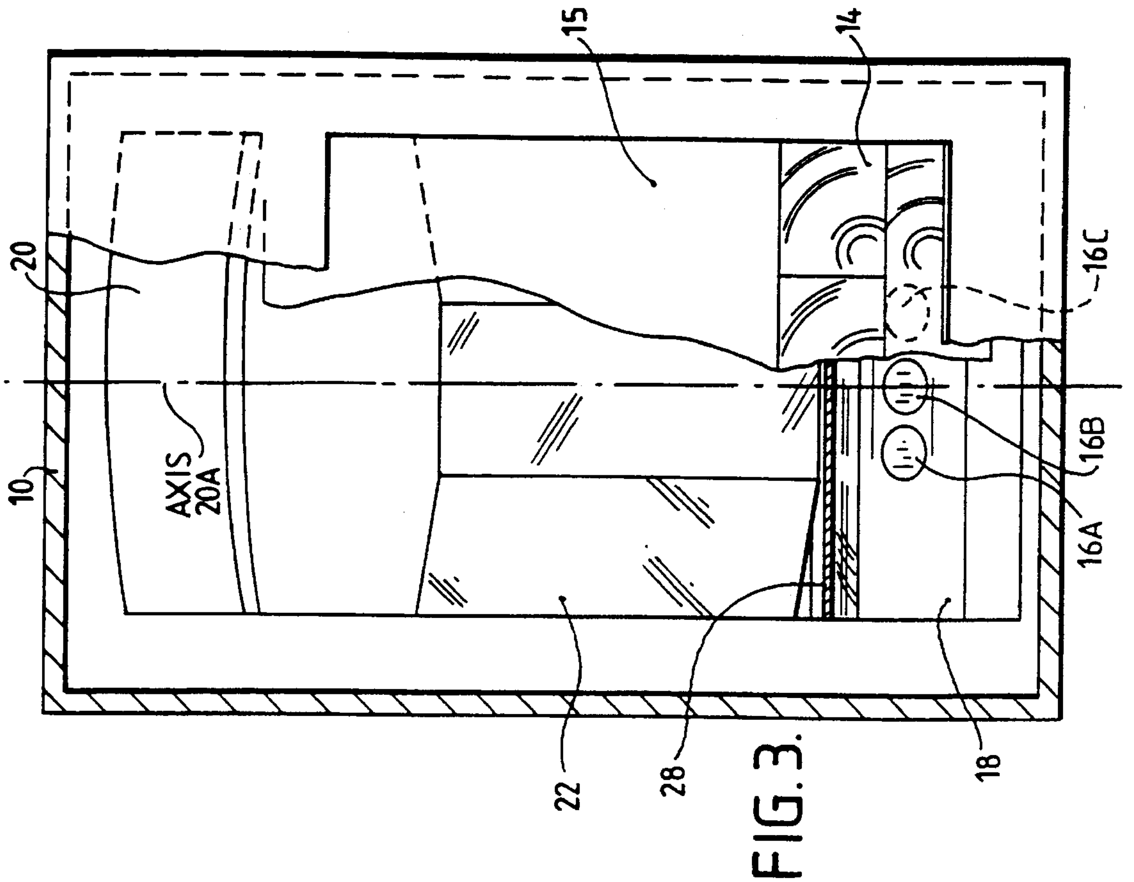
FIG. 3 is a partly cut-away front elevation of the apparatus of FIGS. 1 and 2.

Referring again to FIGS. 1 to 3, sensors 16A to 16C are located adjacent to each other in a horizontal line, the centre sensor 16B being located on the mirror axis 20A of the concave mirror 20 at the focal point with the other two sensors. 16A and 16B spaced equidistantly on each side.

Each sensor contains typically two heat sensing elements 1 mm wide by 2 mm high spaced 1 mm apart horizontally on either side of the sensor central axis. As a result, two fields of view are produced from each sensor having a cross-sectional ratio of 2:1 with a divergence ratio 100:1 horizontally and 50:1 vertically, as shown by reference numerals 24A to 24C, 25A to 25C, 26A to 26C, 27A to 27C, 28A to 28C and 29A to 29C, in FIGS. 5 and 6.

Figure 6:
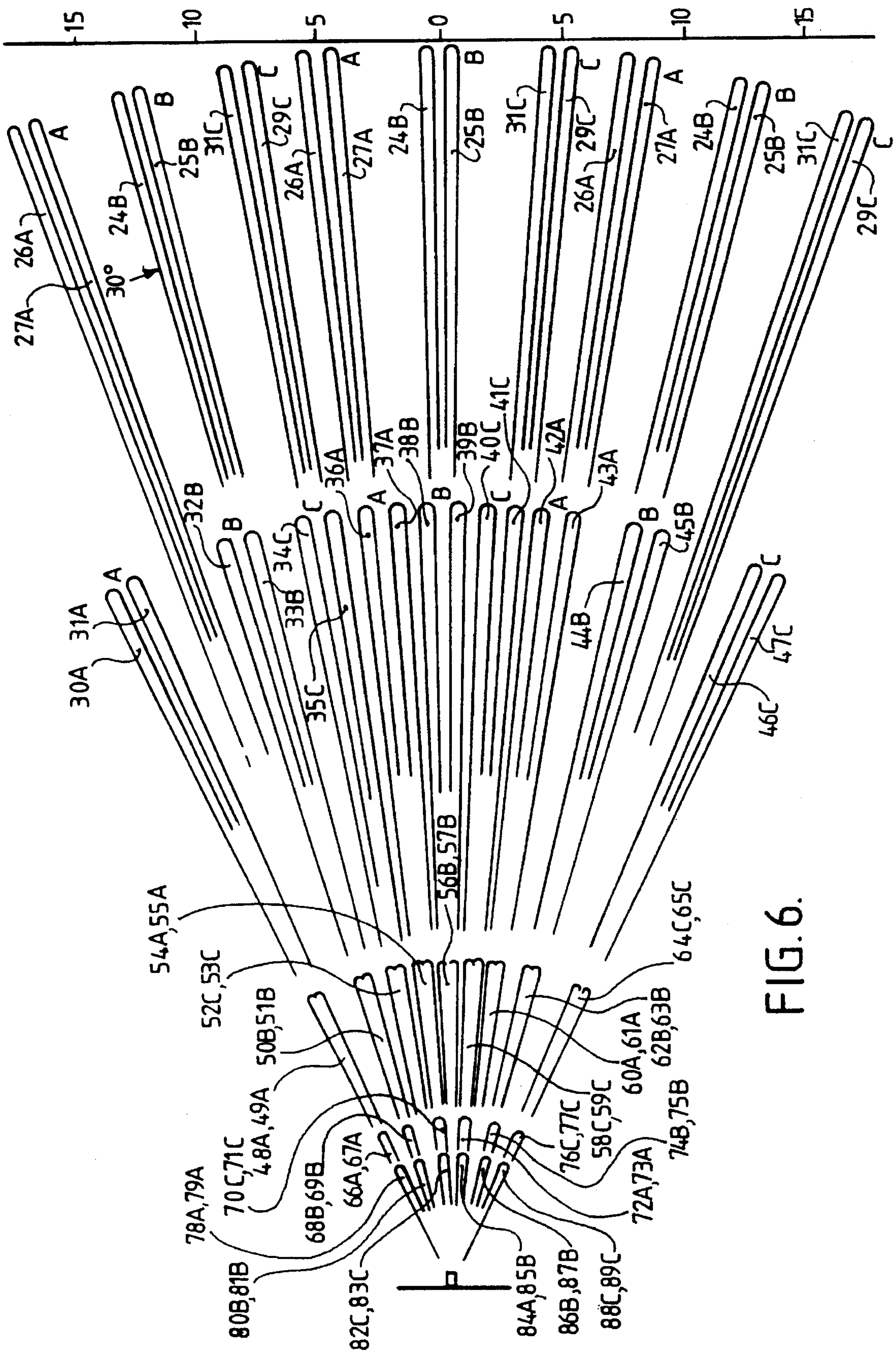
FIG. 6 is a diagrammatic plan view showing the same fields of view as shown in FIG. 5.

If mirror 22 were a single plane mirror, then the three sensors 16A to 16C would produce three spaced apart double fields of view with a divergence proportional to the displacement of the outer sensors about axis 20A. However, since mirror 22 has three plane mirror surfaces 22A, 22B, 22C with the outer two surfaces 22A and 22C inclined inwardly towards the centre mirror surface 22B at angle A and downwardly at angle B, three divergent areas of coverage are created each having three double fields of view produced by the three sensors. Referring to FIG. 6 the three fields of view 26A and 27A are produced by sensor 16A. The three fields of view 24B and 25B are produced by sensor 16B and the three fields of view 31C and 29C are produced by sensor 16C. It can been seen that an intruder moving across the protected area from say left to right in FIG. 6 would produce detection signals at sensor 16A, then 16B, and then 16C with the sequence repeating as further fields of view are crossed. Providing the intruder moves across any two fields of view within the memory pre-set time interval, an alarm condition may be activated.

Figure 2:
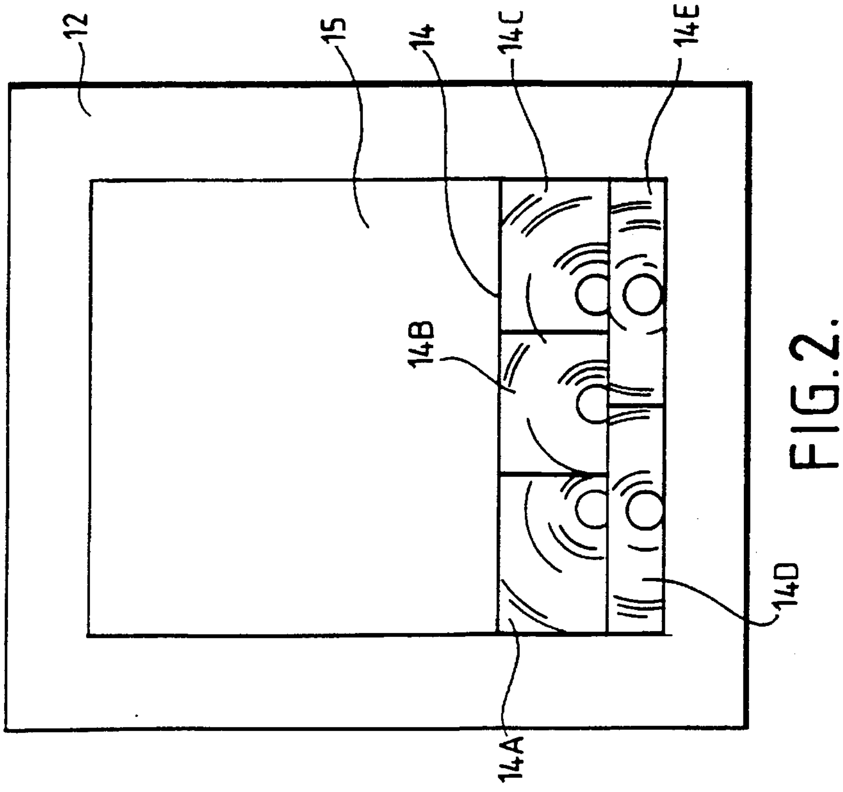
FIG. 2 is a front view of a window of the apparatus of FIG. 1.
Figure 4A:
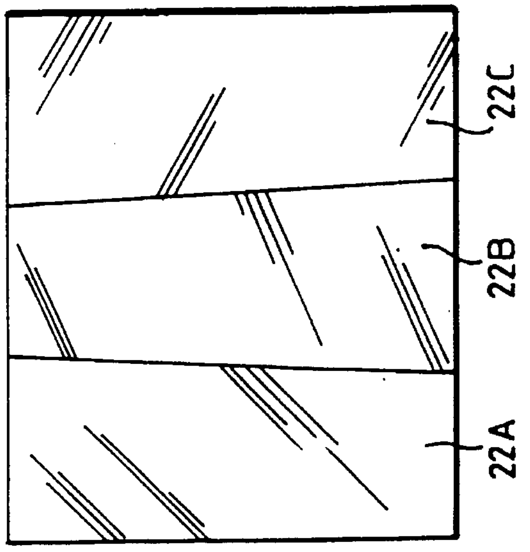
FIGS. 4A, 4B and 4C are respectively a front elevation, a bottom plan view, and a cross-sectional side view of a plane mirror array mounted in the apparatus of FIGS. 1 and 2.
Figure 4B:
Figure 4C:
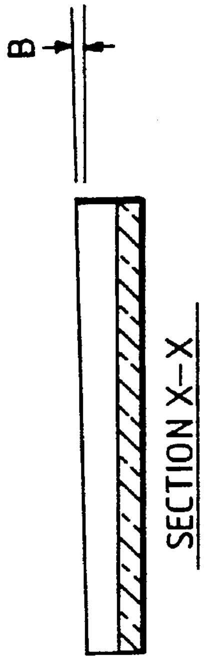

The four ranks of fields of view below the main rank 24 to 27, 29, 31 are produced by a Fresnel lens array located in the lower part 14 of window 12 (FIG. 2).

Lenses forming the array 14 are positive collecting lenses and have a common focal length. Each lens axis is located at suitable positions to produce divergent and declining fields of view to cover the area below the main rank.

Figure 5:
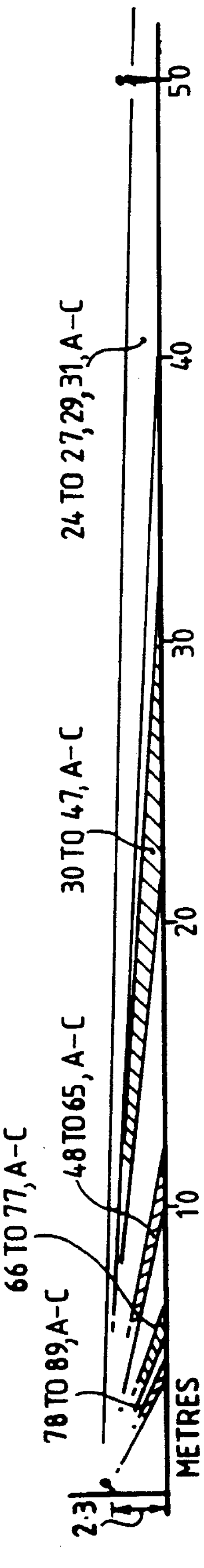
FIG. 5 is a diagrammatic side view illustrating the fields of view of the apparatus, shown in a vertical plane.

Referring to FIGS. 2, 5 and 6, lens 14A produces fields of view 42A to 47C shown in FIG. 5 and also fields of view 60A to 65C from curved secondary mirror 28. Lens 14B produces fields of view 36A to 41C and also fields of view 54A to 59C from curved secondary mirror 28. Similarly lens 14C produces fields of view 30A to 35C and 48A to 53C. Lens 14D produces fields of view 72A to 77C and 84A to 89C from curved secondary mirror 28. Similarly lens 14E will produce fields of view 66A to 71C and 78A to 83C.

Figure 8A:
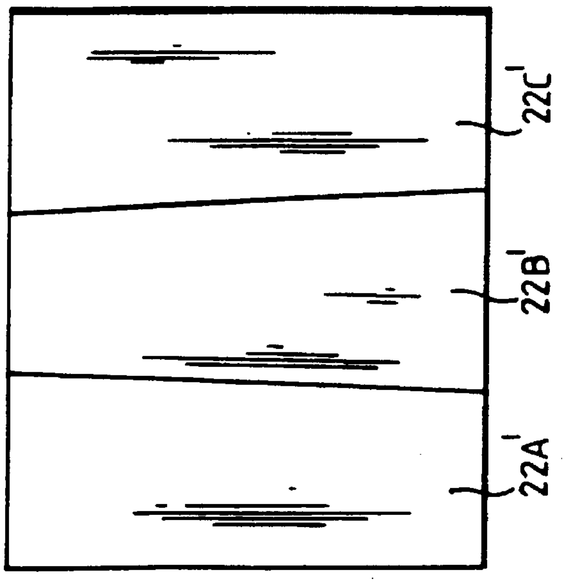
FIGS. 8A, 8B and 8C are respectively a front elevation, a bottom plan view, and a cross-sectional side view of a concave mirror array mounted in the apparatus of FIGS. 1 and 2.
Figure 8B:
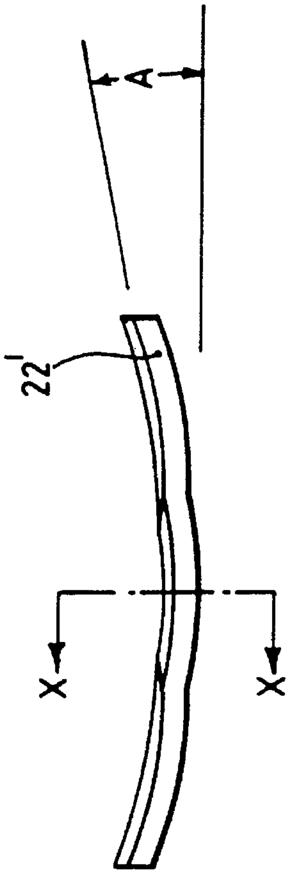
Figure 8C:
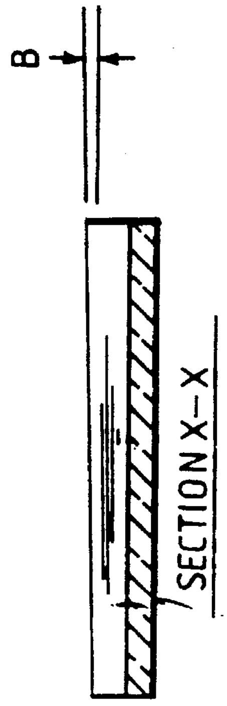

It will be apparent to those skilled in the an that the number and radial spacing of the fields of view may be varied to produce coverage patterns available with a multiplicity of sensing elements variously configured to produce a series of positive and negative-going electrical signals. If, therefore, the double element sensors described earlier were to be replaced by sensors having say, four elements, then the number of fields of view would double. FIGS. 8A–8C show an alternative arrangement for the multi-faceted mirror 22 in which each facet is a concave facet 22'A–C. The alterative mirror is designated 22'.

Further increases in the number of fields of view can be obtained by having more than three dual-element sensors placed at advantageous positions (either adjacent horizontally, or vertically above each other to form additional declining fields of view).

An increased number of fields of view may also be obtained by use of a multifaceted plane mirror army having more than three inclined facets.

It will also be appreciated that the radial area of coverage may be varied from the preferred arrangement described earlier by variation of the relative spacing of the sensors or by changes in the relative inclination of the outer plane mirror facets of the secondary mirror army.

Although detection apparatus providing various field of view layouts may be manufactured as different models, it is possible to include means to adjust the angle of the outer plane mirror facets during or after installation, enabling a user to adjust the area of coverage to match, say, a particular CCTV camera coverage. This adjustment may be carded out manually by means of adjustment screws.

Alternatively, such adjustment may be carded out automatically by use of electric motors or solenoids within the detector housing and controlled from a remote point such as a CCTV monitoring control room. This would enable a remote camera operator to vary the angle of coverage to match changes in the camera lens coverage as may occur when zoom lenses are used.

In a further embodiment the area of coverage may be varied automatically using electrical command signals from, say, a CCTV camera zoom lens remote controller. Thus the motion sensor will always cover the area covered by the camera lens automatically without operator intervention.

It will be appreciated that the electronic processing system described earlier may use more than three channels when more than three sensors are used and that the storage times may be extended or reduced as required. Also the electronic logic system may signal an alarm with combinations other than the 'any two from three' arrangement described.

For example, in installations where there are high numbers of animals and a relatively low security requirement, it may be advantageous to require all electronic stores to contain a motion signal before an alarm is initiated. Conversely, in a high security application with little or no risk of animal activity, it may be advantageous to signal an alarm condition when any one of the stores receives a motion signal.

It will be appreciated that as an intruder crosses sequentially through adjacent fields of view, motion signals will be stored sequentially and may be used to indicate the direction of movement of the intruder.

In a practical embodiment the user may select by means of switches, various logic configurations and storage times to suit the environment.

It will be appreciated that the amplifier and signal processing circuits in each channel may not necessarily be similar. For example, channels used to process signals from the outer (widest angle) fields of view may use higher or lower gain amplification and wider or narrower frequency pass bands in order to compensate for optical losses.

The apparatus described above may be summarised as an infra-red intrusion detector system having a multiplicity of pyro-electric sensors with long pass infra-red filter means, a focusing mirror, a polyethylene film window having a smooth area and a focusing Fresnel lens array. A multi-faceted reflector is located within the field of view of the focusing mirror between that mirror and the polyethylene window. A secondary cylindrically curved reflector is located between the sensor and the Fresnel lens array, the sensor being located substantially at the common focal point of the focal mirror and the Fresnel lens array to produce discrete spaced-apart fields of view. The focusing mirror has a focal length substantially longer than the focal length of the Fresnel lens array to produce relatively narrow long range fields of view in comparison to the fields of view obtained with the Fresnel lens.

Electronic means are employed to process and store separately intruder generated signals and to signal an alarm condition if any two stores contain signals simultaneously within a predetermined time interval.

The Fresnel lens or lens array may be separately located from the smooth window portion. It is also possible to use materials other than polyethylene which transmit infra-red radiation, for example germanium or silicon. This applies both to the Fresnel lens or lens array and to the smooth part of the window.

Uses of the apparatus in addition to intruder detection may include the control of internal or external lighting, and the control of observation cameras, for example.

I claim:

1. Infra-red detection apparatus comprising an infra-red sensor array mounted in a housing, a focusing reflector system constructed and arranged in the housing to focus infra-red radiation received from a first range of distances onto the array, and a focusing refractor constructed and arranged in the housing to focus infra-red radiation from a second range of distances onto the array, the second distance range encompassing distances shorter than the first distance range, wherein the sensor array comprises at least three sensing elements or groups of sensing elements, which elements or groups are spaced apart transversely with respect to a lens axis of the focusing refractor, and wherein the focusing reflector system includes a multiple reflector having at least three reflector surfaces each oriented to direct incoming radiation to a different transverse position on the sensor array.

2. Apparatus according to claim 1, wherein the housing has a front window forming at least part of a front wall of the housing, the multiple reflector is mounted within the housing in a rearward position with respect to the window and directed generally towards the window, and the reflector system further includes a second mirror above or below the window and the multiple reflector and directed generally towards the multiple reflector, the sensor array being respectively below or above the window and the multiple reflector, whereby infra-red radiation entering the housing through the window is reflected by the multiple-reflector onto the second mirror where it is then reflected onto the sensor array.

3. Apparatus according to claim 1, wherein the multiple reflector is a single multi-faceted mirror having three or more facets angled with respect to each other.

4. Apparatus according to claim 1, wherein the multiple reflector is a group of mirrors angled with respect to each other.

5. Apparatus according to claim 1, wherein the focusing reflector system comprises a plane reflector and a concave reflector.

6. Apparatus according to claim 5, wherein the plane reflector is the multiple reflector.

7. Apparatus according to claim 5, wherein the concave reflector is the multiple reflector and has a plurality of concave facets or sections each having a focusing axis angled with respect to the .axes of the other facets or sections.

8. Apparatus according to claim 1, wherein the sensor array comprises a number of sensors which corresponds to the number of reflector surfaces of the multiple reflector.

9. Apparatus according to claim 8, wherein each sensor comprises two or more sensing elements.

10. Apparatus according to claim 9, wherein the sensing elements of each sensor are arranged side-by-side in a transverse direction.

11. Apparatus according to claim 1, wherein the focusing refractor has a plurality of lenses with differently oriented lens axes.

12. Apparatus according to claim 11, wherein the lens axes are arranged to produce fields of view spaced vertically so as to define different ranges corresponding to different declinations with respect to the horizontal.

13. Apparatus according to claim 1, wherein each sensing element or group of sensing elements is connected to an electronic signal processing arrangement constructed so that an alarm condition is signalled only when at least two sensor output signals occur at different respective sensor outputs within a predetermined time interval.

14. Apparatus according to claim 13, wherein the sensor output signals are changes in the voltage level of one or more sensing elements of the sensor.

15. Apparatus according to claim 13, wherein the sensor output signals are changes in the difference between the output voltage levels of two sensing elements of a sensor.

16. Apparatus according to claim 1, comprising an additional reflector located in the housing and arranged to reflect radiation from the focusing refractor onto the sensor array in addition to the radiation focused directly onto the array by the focusing refractor.

17. Apparatus according to claim 16, wherein the additional reflector is a curved mirror.

18. Apparatus according to claim 1, wherein the focal length of the focusing refractor is less than that of the focusing reflector system.

* * * * *